United States Patent [19]
Luick et al.

[11] Patent Number: 5,924,128
[45] Date of Patent: Jul. 13, 1999

[54] PSEUDO ZERO CYCLE ADDRESS GENERATOR AND FAST MEMORY ACCESS

[75] Inventors: Dave A. Luick; Kenneth J. Kiefer; Steve R. Kunkel; Philip B. Winterfield, all of Rochester, Minn.

[73] Assignee: International Business Machines Corporation, Armonk, N.Y.

[21] Appl. No.: 08/668,262

[22] Filed: Jun. 20, 1996

[51] Int. Cl.$^6$ .................................................. G06F 12/06
[52] U.S. Cl. .......................................................... 711/220
[58] Field of Search ............................. 711/3, 200, 220, 711/217; 395/290, 588, 842, 591; 365/230.04

[56] References Cited

U.S. PATENT DOCUMENTS

| | | | |
|---|---|---|---|
| 3,626,427 | 12/1971 | MacSorley et al. | 395/591 |
| 3,671,942 | 6/1972 | Knollman et al. | 364/709.09 |
| 4,068,305 | 1/1978 | Cutler | 711/108 |
| 4,200,926 | 4/1980 | Cochran et al. | 395/887 |
| 4,561,051 | 12/1985 | Rodman et al. | 711/152 |
| 4,587,610 | 5/1986 | Rodman | 711/207 |
| 4,747,043 | 5/1988 | Rodman | 711/124 |
| 4,750,154 | 6/1988 | Lefsky et al. | 365/189.04 |
| 4,760,519 | 7/1988 | Papworth et al. | 595/393 |
| 4,761,755 | 8/1988 | Ardini, Jr. et al. | 364/7 |
| 4,777,594 | 10/1988 | Jones et al. | 395/587 |
| 4,794,517 | 12/1988 | Jones et al. | 395/800.32 |
| 4,833,599 | 5/1989 | Colwell et al. | 395/583 |
| 4,837,738 | 6/1989 | Lemay et al. | 711/220 |
| 4,847,755 | 7/1989 | Morrison et al. | 395/379 |
| 4,884,198 | 11/1989 | Garner et al. | 711/3 |
| 4,920,477 | 4/1990 | Colwell et al. | 711/207 |
| 4,959,776 | 9/1990 | Deerfield et al. | 711/217 |
| 5,021,945 | 6/1991 | Morrison et al. | 395/392 |

(List continued on next page.)

FOREIGN PATENT DOCUMENTS

| | | | |
|---|---|---|---|
| 0474297 | 3/1992 | European Pat. Off. | G06F 9/38 |
| 0479390 | 4/1992 | European Pat. Off. | G06F 9/38 |
| 0605927 | 7/1994 | European Pat. Off. | G06F 9/38 |

OTHER PUBLICATIONS

G.F. Grohoski, IBM Technical Disclosure Bulletin, vol. 33, No. 10B, Mar. 1991, pp. 253–259, "Zero–Cycle Branches in Simple RISC Design".

Todd M. Austin et al., "Streamlining Data Cache Access with Fast Address Calculation," Comp. Sci Dept. University of Wisconsin–Madison, International Sumposium on Computer Architecture, pp. 369–380, Jun. 1995.

Austin et al., "Zero–Cycle Loads: Microarchitecture Support for Reducing Load Latency", Microarchitecture, 1995 International Symposium. pp. 82–92, Nov. 1995.

Smith et al., "The Microarchitecture of Superscalar Processors," Proceedings of the IEEE, vol. 83, No. 12. pp. 1609–1624, Dec. 1995.

(List continued on next page.)

*Primary Examiner*—Eddie P. Chan
*Assistant Examiner*—Kevin L. Ellis
*Attorney, Agent, or Firm*—Karuna Ojanen; Birch, Stewart, Kolasch & Birch

[57] ABSTRACT

A method and apparatus estimate the memory address needed for a low level programming instruction in reduced instruction set computing systems. Taking advantage of a known computing environment and data architecture, bits from a displacement field in an Instruction Register may be combined with bits from a Base Register through hardware logic circuitry, preferably performing a mathematical computation such as addition. Together with bits gated directly from the Base Register and the displacement field, the combined bits form an estimate of the effective address of the desired memory location. The estimation is performed early in an instruction cycle, and therefore allows data from the memory, preferably a Data Cache, to be available at the end of the next instruction cycle, thus producing the address in what appears to be zero cycles. The method and apparatus avoid stall conditions from the CPU, and are particularly useful for Very Long Instruction Word architecture.

37 Claims, 11 Drawing Sheets

U.S. PATENT DOCUMENTS

| | | | |
|---|---|---|---|
| 5,029,069 | 7/1991 | Sakamura | 395/581 |
| 5,051,940 | 9/1991 | Vassiliadis et al. | 364/736.04 |
| 5,053,986 | 10/1991 | Ahsan et al. | 364/736.03 |
| 5,057,837 | 10/1991 | Colwell et al. | 341/55 |
| 5,081,574 | 1/1992 | Larsen et al. | 395/581 |
| 5,081,575 | 1/1992 | Hiller et al. | 395/312 |
| 5,119,324 | 6/1992 | Ahsan | 364/736.03 |
| 5,127,092 | 6/1992 | Gupta et al. | 395/581 |
| 5,175,824 | 12/1992 | Soderbery et al. | 395/312 |
| 5,179,680 | 1/1993 | Colwell et al. | 711/125 |
| 5,182,811 | 1/1993 | Sakamura | 395/737 |
| 5,197,135 | 3/1993 | Eickemeyer et al. | 395/393 |
| 5,197,137 | 3/1993 | Kumar et al. | 395/677 |
| 5,201,039 | 4/1993 | Sakamura | 711/201 |
| 5,201,057 | 4/1993 | Uht | 395/800.18 |
| 5,204,841 | 4/1993 | Chappell et al. | 365/230.05 |
| 5,212,780 | 5/1993 | Padgaonkar et al. | 365/230.04 |
| 5,214,763 | 5/1993 | Blaner et al. | 395/388 |
| 5,222,221 | 6/1993 | Houri et al. | 395/676 |
| 5,222,229 | 6/1993 | Fukuda et al. | 395/553 |
| 5,261,066 | 11/1993 | Jouppi et al. | 711/122 |
| 5,274,790 | 12/1993 | Suzuki | 395/133 |
| 5,276,821 | 1/1994 | Imai et al. | 395/390 |
| 5,287,467 | 2/1994 | Blaner et al. | 395/582 |
| 5,295,249 | 3/1994 | Blaner et al. | 395/389 |
| 5,299,319 | 3/1994 | Vassiliadis et al. | 395/562 |
| 5,299,321 | 3/1994 | Iizuka | 395/388 |
| 5,301,340 | 4/1994 | Cook | 395/800.04 |
| 5,303,356 | 4/1994 | Vassiliadis et al. | 395/585 |
| 5,303,357 | 4/1994 | Inoue et al. | 395/709 |
| 5,307,506 | 4/1994 | Colwell et al. | 395/307 |
| 5,313,551 | 5/1994 | Labrousse et al. | 711/149 |
| 5,317,718 | 5/1994 | Jouppi | 711/137 |
| 5,317,734 | 5/1994 | Gupta | 395/706 |
| 5,333,280 | 7/1994 | Ishikawa et al. | 395/588 |
| 5,347,639 | 9/1994 | Rechtschaffen et al. | 395/379 |
| 5,355,335 | 10/1994 | Katsuno | 365/189.04 |
| 5,355,460 | 10/1994 | Eickemeyer et al. | 395/391 |
| 5,359,718 | 10/1994 | Phillips et al. | 395/562 |
| 5,361,385 | 11/1994 | Bakalash | 395/424 |
| 5,367,694 | 11/1994 | Ueno | 395/800.23 |
| 5,384,722 | 1/1995 | Dulong | 364/715.012 |
| 5,386,562 | 1/1995 | Jain et al. | 395/709 |
| 5,398,321 | 3/1995 | Jeremiah | 395/392 |
| 5,404,469 | 4/1995 | Chung et al. | 395/391 |
| 5,408,658 | 4/1995 | Rechtschaffen et al. | 395/393 |
| 5,412,784 | 5/1995 | Rechtschaffen et al. | 395/595 |
| 5,414,822 | 5/1995 | Saito et al. | 395/587 |
| 5,420,809 | 5/1995 | Read et al. | 364/715.01 |
| 5,421,022 | 5/1995 | McKeen et al. | 395/800.23 |
| 5,426,743 | 6/1995 | Phillips et al. | 395/563 |
| 5,428,807 | 6/1995 | McKeen et al. | 395/392 |
| 5,434,972 | 7/1995 | Hamlin | 395/200.68 |
| 5,440,751 | 8/1995 | Santeler et al. | 395/842 |
| 5,448,703 | 9/1995 | Amini et al. | 395/290 |
| 5,448,705 | 9/1995 | Nguyen et al. | 395/591 |

OTHER PUBLICATIONS

U.S. Statutory Invention Registration H1291, Hinton et al., Feb. 1, 1994.

P.G. Emma, et al., IBM Technical Disclosure Bulletin, vol. 31, No. 8, Jan. 1989, pp. 12–13, "Effecting A One–Cycle Cache Access In A Pipeline Having Combined D/A Using A Belt".

Kemal Ebcioglu, IBM Research Division, Research Report "Some Design Ideas for A VLIW Architecture for Sequential–Natured Software," Proceedings of IFIP WG 10.3 Working Conference on Parallel Processing, (M. Cosnard et al., eds.) 1988.

PSEUDO ZERO CYCLE ADDRESS GENERATOR AND FAST MEMORY ACCESS

FIELD OF THE INVENTION

The present invention relates to a method and apparatus for generating a memory address used by a programming instruction. More particularly, the present invention relates to a method and apparatus for estimating the address of a data cache in less than one instruction cycle.

BACKGROUND OF THE INVENTION

In conventional reduced instruction set computer systems in which cycle times are driven to the point where address generation becomes a significant issue in terms of time, when a machine level programming instruction requires something from a particular memory address then the fastest memory access path includes three instruction cycles. The first instruction cycle is spent generating the memory address. At the start of the second cycle, the memory is provided with the memory address so that the data will be accessed and made available at the start of the third instruction cycle.

A full instruction cycle may be needed in order to generate that memory address. For example, if the instruction identifies the memory address as a displacement from a known address, a full instruction cycle is required in order to add the displacement to the known address. Once the memory address is known, the memory can be accessed and the instruction execution completed.

Although high speed memories, e.g. high speed data caches, are conventional and can be accessed quickly, the delay caused by generating the memory address may force the instruction to be stalled by a central processing unit. A full instruction cycle must pass before the CPU may resume processing the instruction.

This delay, or stall, becomes more pronounced when the system implements VLIW technology (Very Long Instruction Word). In VLIW, a compiler concatenates several, e.g. 8–16, instructions or parcels into one. If the one very long word is stalled, then all of its instructions are stalled. "Some Design Ideas for a VLIW Architecture for Sequential-Natured Software" by Kemal Ebcioglu (published in *Proceedings of IFIP WG* 10.3 *Working Conference on Parallel Processing* (M. Cosnard et al., eds.) North Holland 1988), provides pertinent VLIW background, and is formally incorporated herein by reference.

Designing computer systems of the Von Neumann type, with high levels of performance, includes considerations such as the fastest possible cycle time for the central processing unit (CPU), instruction and data cache (I-cache and D-cache) subsystems which can be accessed with similar cycle times as the CPU ("single cycle access"), and having adequate bandwidth between the CPU and caches, i.e. the number of bytes which may be transmitted with each clock cycle. Any of these considerations taken individually may be sufficient to throttle the flow of data and instructions through the system.

As the cycle times for CPUs implemented in the fastest VLSI (Very Large Scale Integrated circuit) technologies approach their theoretical limits dictated by light speed, the number of operations which must take place along the critical path between the CPU and the cache must be restricted to a minimum.

SUMMARY OF THE INVENTION

Accordingly, the present invention is designed to permit the cache to be accessed with one cycle latency, i.e. waiting only one cycle. In order to do so, the cache must receive as early in the instruction cycle as possible the address which is to be used to initiate the access, i.e. the access to the data cache array. In general, most instruction set architectures perform the address generation phase by adding the full address widths of an immediate value and a value contained in a register, or adding together the full address widths of two registers ("base" plus "index"). When cycle times become sufficiently small, the time required to perform an address add makes the generated address available too late in the first instruction cycle for the cache to be able to return the accessed data in a single subsequent instruction cycle.

The pseudo zero cycle addressing scheme of the present invention operates under a just-in-time addressing premise.

Cache memory is normally configured in such a way that it is addressed by several incremental address portions. For example, a column select, row select and a late select may be used to select the address for a cache memory location. These different addressing fields must be addressed at varying instances in time so that the memory location will be specified. For example, depending upon cache configuration, row selection and column selection might be required prior to late selection.

The concepts of the present invention allow the address of the desired location in cache to be partially specified prior to combining the base address and displacement so that the address portions first needed are first available. For example, the most significant bits of the cache address might specify a row address and a column address, portions of the memory address which are not affected by the displacement. It is a premise of the system of the present application to access the most easily accessed address portions first while the more difficult to ascertain address portions are calculated.

The just-in-time addressing of the present invention allows the CPU to calculate the portions of the address specified by both base address and displacement last, giving the processor the maximum amount of time to perform those calculations. The address portions which must be accessed first are provided in areas which may be directly read by the base or the displacement, while address portions which are calculated based upon both the base address and displacement must be accessed later. Thus, there is an opportunity to calculate these latter address portions in such a way that the fastest possible addressing of the cache memory may be performed.

According to the teachings of the present application, this fast address generation from the base and displacement is performed between the instruction cycle which causes the accessing of the instruction and the instruction cycle in which information is transferred out of the appropriate location in cache memory. Between these two time consecutive instruction cycles, address generation from the base and displacement address portions is performed. Accordingly, a full addressing from cache is possible within two instruction cycles.

According to further teachings of the present application, the generated address may be used to access information found within a cache buffer prior to actual storage of the information into its ultimate location in the cache. For example, the system of the present invention uses a cache address to look not only for the contents of the specified cache memory location, but also for information in the cache buffer which is bound for that cache memory location.

In many cases, it takes several memory cycles to transfer information from the buffer to the cache. When information is being sent to the cache memory for storage, and a request for that information is immediately encountered, current computer systems require the information to be loaded into the cache before attempting to retrieve it. The system of the present application, however, monitors the target location of each information element to be loaded in the cache. If there is a call for information from the target location, then the information element is removed from the buffer rather than waiting for it to be first stored in the cache memory.

Accordingly, it is a primary object of the present invention to take advantage of a system's organization in order to formulate a specific and highly accurate early-in-the-cycle estimate of the data address which will be generated by a load or store instruction.

It is another object of the present invention to take advantage of memory and processing architectures in order to estimate desired memory addresses by combining bits from a base address and a displacement address as quickly as possible during instruction execution. The resulting combination is generated early enough to allow information to be retrieved from memory with what appears to be a zero-cycle address generation.

These and other objects of the present invention are fulfilled by providing a method and apparatus for retrieving information from a location in memory within a reduced number of instruction cycles, the method comprising the steps of (a) providing a load instruction having a displacement field specifying in part the address of the location in memory; (b) calculating the address of the location in memory from at least said displacement field; (c) accessing the location in memory based on said address calculated in said step (b), said steps (a) and (c) of respectively providing and accessing being performed in consecutive instruction cycles with said step (b) being performed therebetween.

The objects may also be fulfilled by providing a method and apparatus for generating a memory address in an address register, the method comprising the steps of receiving an instruction command into an instruction register, the instruction command including a base register identifier and a displacement identifier; accessing a base register identified by the base register identifier; gating a first set of bits from the base register into a first predetermined portion of an address register; gating a second set of bits from the displacement identifier into a second predetermined portion of the address register; and adding a third set of bits from the base register to a fourth set of bits from the displacement identifier and providing a sum output, the sum output being providing to a third predetermined portion of the address register.

The objects may also be fulfilled by providing a method and apparatus for retrieving a desired one of a plurality of information elements as it is being stored into a main memory, each information element being provided to the main memory from a buffer bank and having a target address associated therewith specifying a location in main memory, the method comprising the steps of holding, in the buffer bank, at least one first information element to be stored into the main memory; providing target address data associated with each first information element held in step (a); providing a load command requesting contents of a desired memory address in the main memory where desired information is to be retrieved; comparing at least a portion of the desired memory address with a corresponding portion of the target address, and producing a comparison result when the compared portions are identical; forwarding the first information element from the buffer bank to an output port if the comparison result of step (c) is produced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art upon review of this detailed description.

BRIEF DESCRIPTION OF THE DRAWINGS

The present invention will become more fully understood from the detailed description and accompanying drawings, which are given by way of illustration only, and thus are not to be considered as limiting the present invention, and wherein.

DETAILED DESCRIPTION OF THE PREFERRED EMBODIMENTS

Figure 1A:
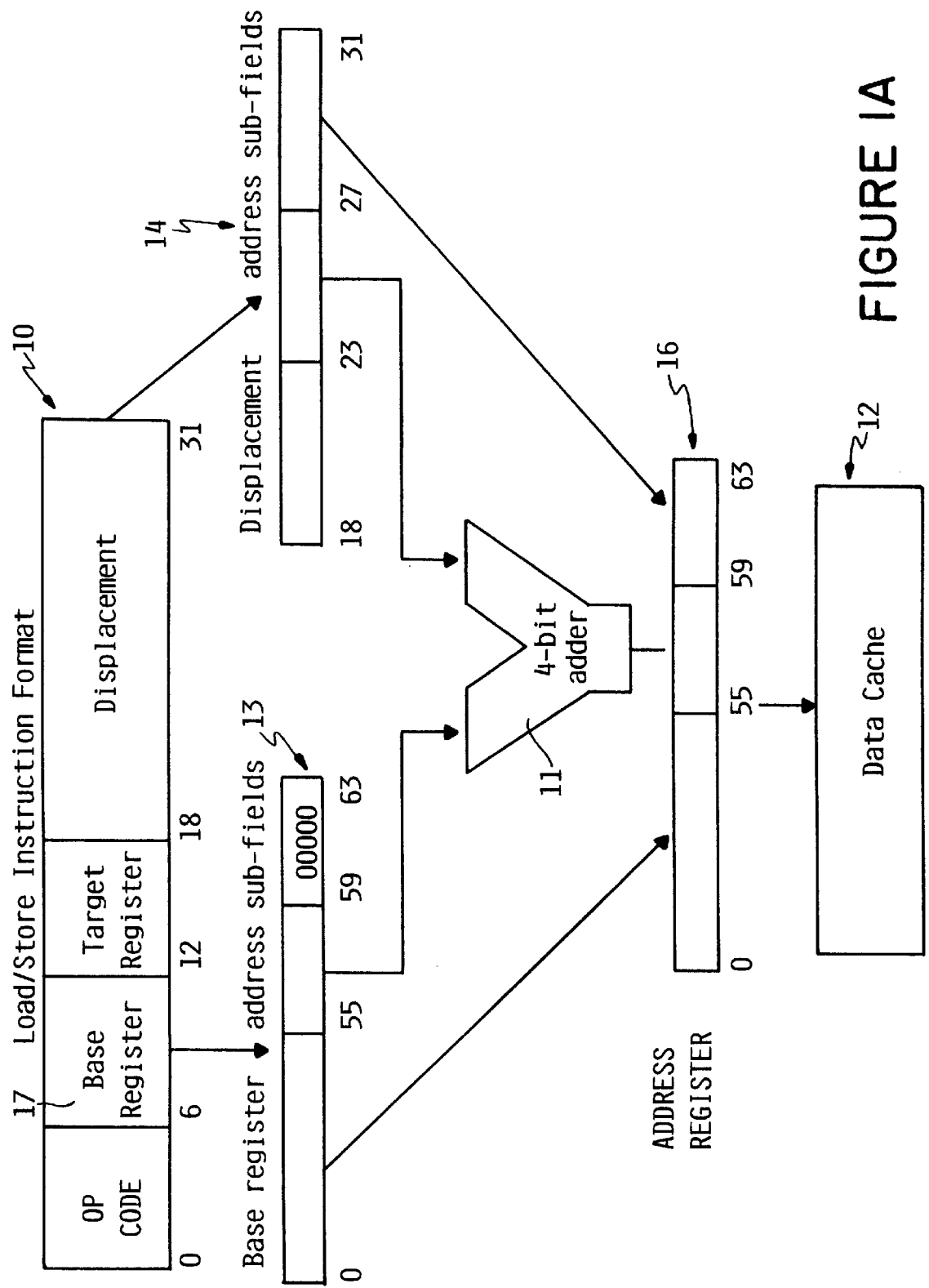
FIG. 1A is a schematic representation of circuitry according to one embodiment of the present invention.
Figure 1B:
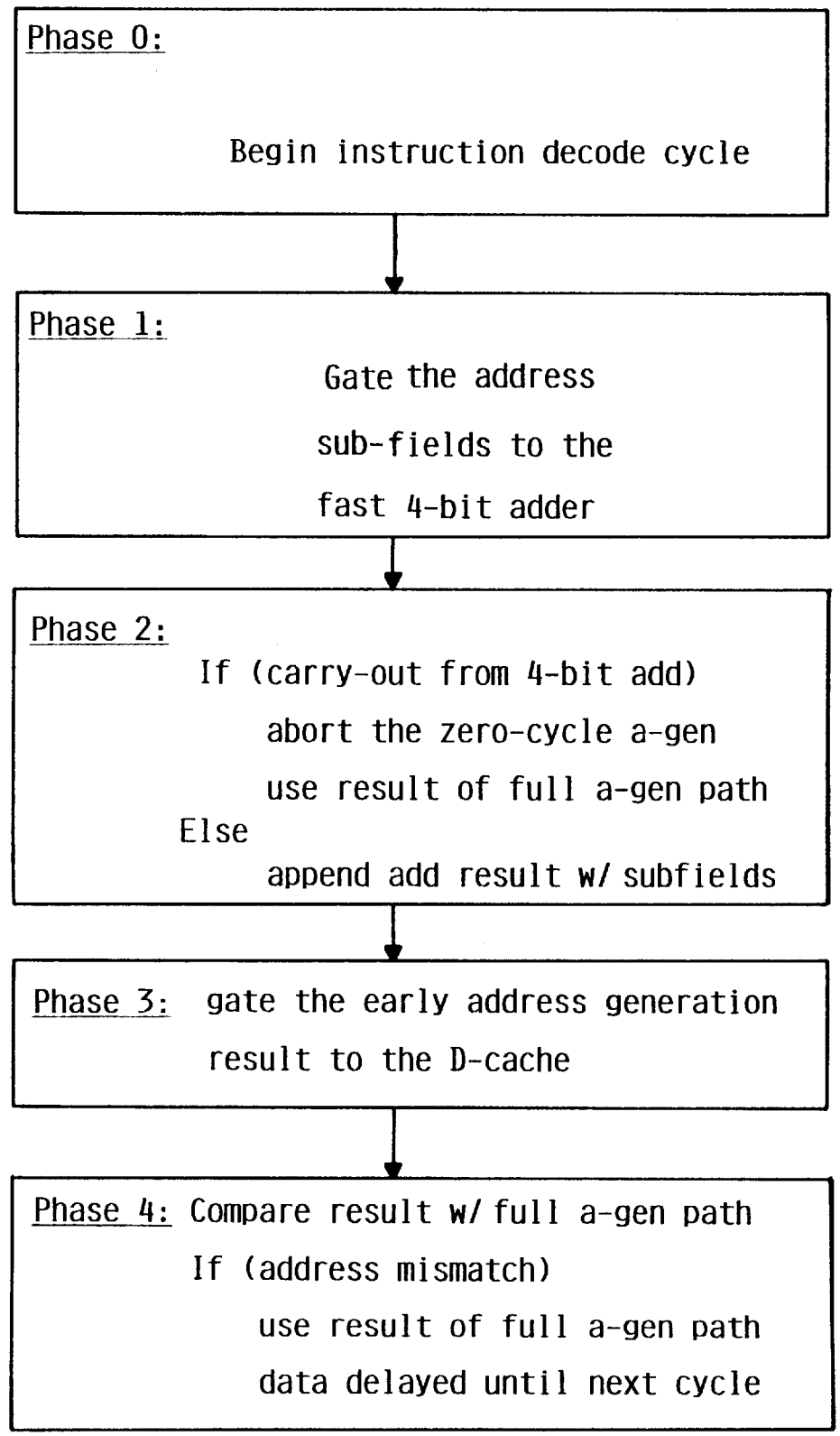
FIG. 1B is a flow diagram illustrating operation of the embodiment described with respect to FIG. 1A.

Referring to FIGS. 1A and 1B, a first embodiment of the present invention will be described. FIG. 1A shows an Instruction Register 10 which receives an instruction to be executed by the CPU. Among the several types of instructions which will be executed over the course of a programming routine, a load instruction which reads information from memory and a store instruction which writes information to memory are of particular importance to the present invention because of their interaction with the memory. In the embodiment of FIG. 1A, the memory is preferably a Data Cache 12, which is accessed based upon an effective address provided in an Address Register 16. Address Register 16 is operatively associated with Data Cache 12 through conventional hardware circuitry known to those skilled in the art, which circuitry needs not be further detailed herein.

A Base Register 13 is provided, and is preferably a General Purpose Register operatively associated with the CPU and with the Instruction Register 10. FIG. 1A also shows the displacement field (bits 18–31) of the Instruction Register 10 in isolation at reference numeral 14.

Preliminary assumptions about the computing environment and data architecture begin with the format of low level instructions held in Instruction Register 10. The instruction held in Instruction Register 10 is preferably formatted according to the conventional "D-form" format. D-form format provides a displacement field (bits 18–31 in FIG. 1A) embedded into the instruction register or instruction primitive. The displacement will be described in more detail below, and essentially indicates the distance from a base address in the data cache 12 where the desired information is to be found. It is to be understood, however, that the present invention may be adapted to other instruction formats as well.

The instruction also has an OP Code field which indicates the type of instruction and may be supplemented by Extended OP Code fields if necessary. For load/store instructions, the instruction provides a base register, such as bits 6–11 in FIG. 1A. The use of six bits indicates that a total of 64 base registers may be accessed by the instruction, although the number of base registers would actually depend on the architecture of the CPU.

The instruction also contains the identity of a target register, e.g. bits 12–17 in FIG. 1A. The target register identifies a register, preferably a General Purpose Register, to which data will be written. After a load instruction, the target register will ultimately hold the information found at the data cache address which is accessed by the present invention.

The memory location in the data cache 12 to be accessed has an address which is based upon the displacement field 14 of the Instruction Register 10 and the contents of the base register 13. The base register 13 contains a 64-bit address pointing to a base memory location in data cache 12. Although a data cache 12 is illustrated in FIG. 1A, it is to be understood that other types of memory may also be accessed by the present invention. Instruction caches (I-caches) and other memories are possible; if memories or memory types are used together, then respective memories may be accessed depending on the type of instruction held in Instruction Register 10.

Data cache 12 is preferably organized by the compiler according to predetermined object sizes. That is, the compiler lays out data objects in an alignment in memory. The data cache itself may be physically organized according to object sizes, but it is preferable to have the objects organized by the compiler. For example, the compiler may organize data in the data cache 12 to hold information in predetermined blocks of 32 bytes. By forcing all information to be stored in data cache 12 at intervals of 32 bytes, the compiler achieves alignment of the object sizes. The present invention takes advantage of this alignment (which is typically 16, 32, 64 bytes, etc. (powers of two)) by assuming that the lower several bits held in base register 13 are 0's. In FIG. 1A, 32-byte alignment is used, as indicated by the assumption that the base register contains five 0's as its least significant bits (i.e. bits 59–63).

The displacement field 14 identifies an offset from the data cache location pointed to by the base register's contents. The first several bits (18–22) of displacement field 14 in instruction register 10 are essentially unused in FIG. 1A because the data object organization forced by the compiler is such that the nine lower bits (23–31) are enough to represent most of the displacements which will be encountered by the system. This is merely an illustration of the present invention and should not be considered limiting.

In conventional systems, if an instruction held in Instruction Register 10 were to require information from data cache 12, the appropriate cache address would be generated by performing a full add of the displacement 14 and the contents of base register 13. In other words, the fourteen bits contained within the displacement field (bits 18–31 in FIG. 1A) are added to all bits 0–63 contained within the base register 13. This sixty-four-bit add is a time consuming operation, requiring at least one full instruction cycle. The information from data cache 12 would be available only after the cache address is generated. Accordingly, the instruction held in the OP Code field of Instruction Register 10 must be stalled for at least one instruction cycle by the CPU until the information becomes available.

The embodiment of FIG. 1A takes advantage of the data organization by using displacements 14 which are in one direction only and indicated only by unsigned integers. In addition, the present embodiment assumes that the computing environment is designed such that most of the cache addresses generated by the (base + displacement) arithmetic will fall within a distance from the base address that is significantly smaller than the largest displacement size. In other words, most cache addresses will be close to the base address. By the present invention, the memory address may be estimated with significant accuracy, on the order of about 90% when empirically tested.

Using the above assumptions, the embodiment of FIG. 1A formulates a guess of the most likely cache address by manipulating the base address bits held in base register 13 and the displacement bits held in the displacement field 14. Preferably, the manipulation includes using a 4-bit fast adder 11 for adding only some of the bits from base register 13 and displacement 14.

The flow diagram of FIG. 1B illustrates a preferred operation of the embodiment of FIG. 1A. The process of generating the address includes five component phases, and is completed before the expiration of one instruction cycle.

In Phase 0, a first instruction cycle is initiated, beginning with a decode on a load or store instruction residing in the Instruction Register 10. The base register field 17 in the Instruction Register 10 is used to identify the base register 13, preferably a General Purpose Register GPR, which contains a base address. The base address corresponds to a location in data cache 12. In FIG. 1A, base register 13 is shown to have 64 bits (0–63), although the actual length would depend on the CPU architecture.

As indicated previously, data objects in the data cache 12 are organized so as to have 32-byte alignment of its object sizes. Accordingly, the base address in base register 13 will have 0's in its five least significant bits (59–63), i.e. $2^5=32$.

In Phase 1, the fast 4-bit adder 11 adds respective four-bit sub-fields from the base register 13 and from the displacement field 14 of the Instruction Register 10. Referring to the example of FIG. 1A, adder 11 is respectively provided with bits 55–58 from the base register 13, and bits 23–26 from the displacement field 14 of the Instruction Register 10. The sum from 4-bit adder 11 is available within only a few logic switch delays because the adder is preferably implemented using fast logic circuitry. It should be noted that the 4-bit adder of this embodiment is exemplary only, and any suitable sized adder could be used, as appropriate.

Although the reliability of the present invention is high, it is preferable, if not essential, also to utilize a full (conventional) address generation path using the full address widths for the address computation. The full address generation path is initiated in Phase 1 as a backup of the inventive address generation, and will be used to verify that the fast address generation of the present embodiment has resulted in a correct address estimation. Because the full address generation path is time consuming, it cannot be completed until very late in the first instruction cycle (see Phase 4); so late, in fact, that the data cache cannot retrieve the desired information until the second instruction cycle has expired. If the full address generation path is relied on in Phase 4 (below), and if the second pipelined instruction has a dependency on the load instruction initiated in the first cycle, then the CPU will stall the completion of the second pipelined instruction until the end of the third instruction cycle. This stall is avoided in the present embodiment. Here, an "instruction cycle" is to be distinguished from a clock cycle; an instruction cycle typically will include multiple clock cycles.

Also in Phase 1, the low order five bits (bits 59-63) included in the base register 13 are assumed to be zero, as stated above. Accordingly, the present embodiment takes advantage of the data organization by making it unnecessary to add those bits (59–63) of base register 13 to the corresponding bits (27–31) of displacement field 14. Instead, bits 59–63 of base register 13 can be ignored, and bits 27–31 gated directly into the address register 16.

If the data objects are configured with a different alignment, say 64 bytes, then the appropriate number of low order bits (58–63) in the base register 13 will be assumed to be zero or simply ignored. Similarly, the appropriate number of least significant bits (bits 26–31) in the displacement field 14 of the Instruction Register 10 will be gated to the Address Register 16. The least significant bits in the base register 13 may be forced to zero under control of the compiler if object alignment is compiler enforced.

In Phase 2, the sum produced by 4-bit adder 11 is inspected for a carry-out. If the sum is five bits long, then a carry-out is produced by adder 11 (like the "carry" of pencil-and-paper addition). If the sum is four or fewer bits, then no carry-out is produced.

If a carry-out is found, then the address generated by the present embodiment is an incorrect address. The process is aborted. Referring to the embodiment of FIG. 1A, if the 4-bit adder 11 produces a carry-out, then the resulting address contained within Address Register 16 is incorrect, namely because bit 54 will have an incorrect value. Bit 54 should have been changed due to the carry-out from adder 11. The correct memory address must come from the full address generation path which was initiated in Phase 1 but will not be completed until Phase 4.

If the system must wait for the full address generation path, then the CPU must stall the load or store instruction held in Instruction Register 10 until the cache address is generated and its contents made available. However, this wait is the same as would be encountered in conventional full-address generating techniques. Accordingly, the present embodiment does not cause any additional time delay.

If there is no carry-out from adder 11, then the 4-bit sum supplied to bits 55–58 of the Address Register 16 are appended with the upper 55 bits (0–54) from the base register 13 and with the low order five bits (27–31) from the displacement field 14 of the Instruction Register 10. The resulting 64-bit address within the Address Register 16 is deemed to be a correct estimation of the desired address.

In Phase III, the estimated memory address in Address Register 16 is gated to the data cache 12. The data cache 12 initiates an access to the array based on the estimated address and provides the desired information. Accordingly, the estimated cache address is generated early enough to permit the data cache to have the address before expiration of a the first instruction cycle. In the second instruction cycle, the data cache retrieves the information from the address and forwards it for storage in the target register.

The present embodiment thus provides single cycle latency, allowing the system must wait only one cycle for the memory to be accessed. Accordingly, the present embodiment generates the cache address in what appears to be zero instruction cycles.

Figure 2:
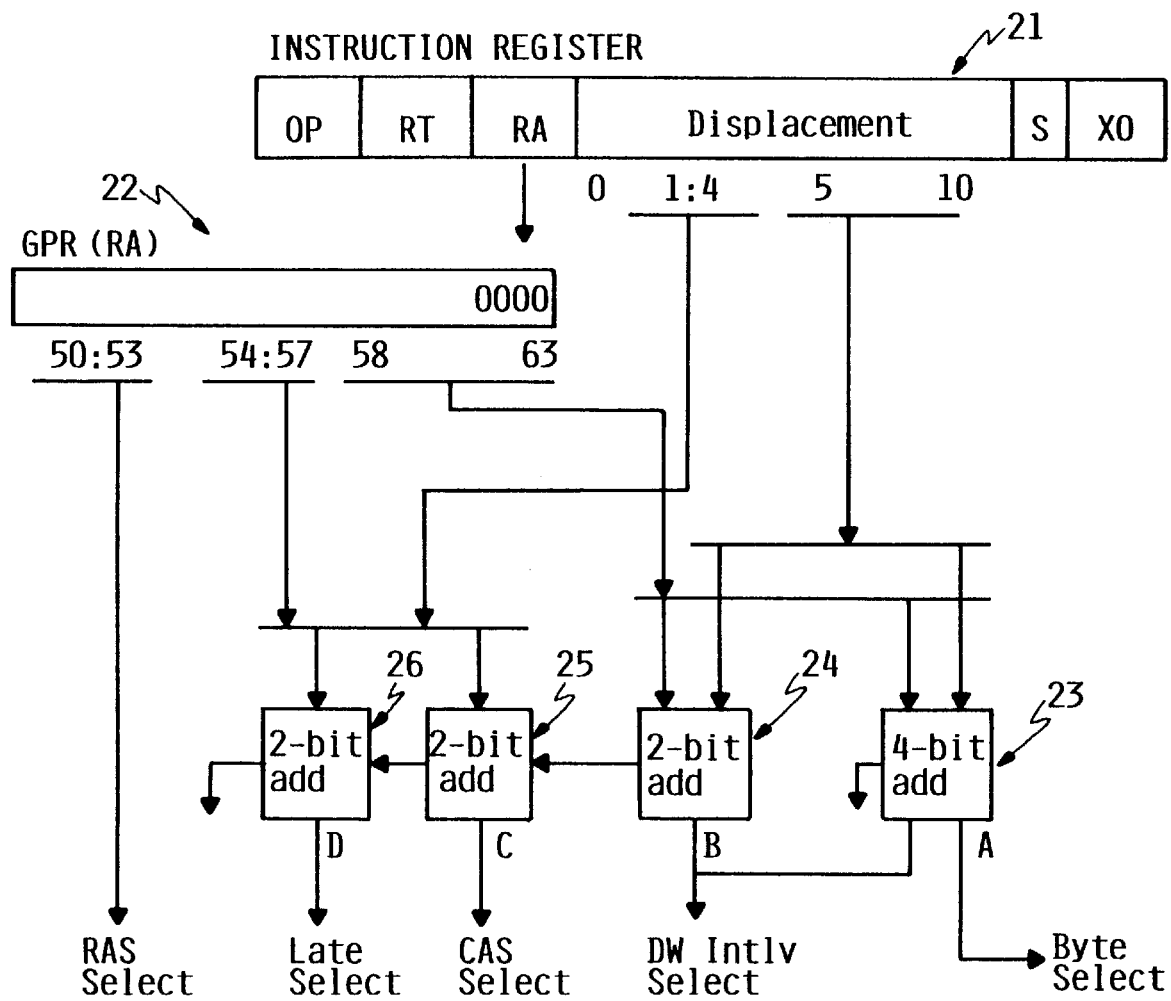
FIG. 2 is a schematic representation of circuitry according to another embodiment of the present invention.

It should be noted that the discussion of FIG. 2 is directed to a 2-cycle pipeline embodiment. It is also possible to adapt the present invention to a single-cycle D-cache. For example, if the embodiment is used in systems having generous clock cycles (i.e. a slow clock), then it is certainly possible to pipeline the cache access into a single cycle in which the address is generated and the information retrieved from memory. However, with current microprocessor science, it is unlikely that clock speeds would be so generous.

In Phase IV, the address generated along the full address generation path is compared to the address produced according to the present embodiment. A preliminary validation test was preferably performed in Phase 2 by looking for the carry-out from adder 11. An additional validation is preferably performed here by comparing the addresses generated by the two paths. If the two addresses are not identical, then the information retrieved from the cache is thrown away (e.g. not forwarded). The cache array access is reinitiated using the address from the full address generation path. Subsequent operations which depend on the information accessed from the cache are stalled by the CPU until the correct information becomes available in the next instruction cycle.

If, on the other hand, the address estimated by the present embodiment is found to be identical to that produced by the full path (Phase 4), then the estimate was correct and the information from the cache 12 is already available for use in the next immediate instruction cycle.

Accordingly, the present embodiment generates the memory address within instruction cycles by relying on the organization of data, and reduces the likelihood of bottlenecks in the address generation path. The present embodiment may be configured for known computing structures and data object organizations used by typical application programs. By having the cache array access initiated as early in the instruction cycle as possible, the present embodiment provides the ability to perform single cycle data cache access. This may increase system performance by 20% or more.

Although the present embodiment preferably accesses data cache (D-cache), it is also applicable for accessing other memories, such as an instruction cache (I-cache).

As indicated previously, the present embodiment is particularly suitable for use with VLIW (Very Long Instruction Word) architecture. This architecture is often provided with a layered memory subsystem having, for example, four levels of cache memory (the lowest levels being designated L0 and L1). In order to access these cache memories in an instruction cycle time of about 2 nanoseconds, another embodiment implementing the concepts of the present invention is shown in FIGS. 2–4.

FIG. 2 shows an instruction register having a different format than that shown in FIG. 1A. The exact format used to implement the present invention may be any of a variety of formats, as long as the designated fields are known. Preferably, a D-form Instruction format is used. In FIG. 2, an Instruction Register 21 is provided with an OP field designating the type of instruction. The instruction may be load/store instructions, which are of particular relevance to the present embodiment because of their interaction with memory. The S and XO fields of Instruction Register 21 can also be used to help specify the instruction type. Field RT designates the target register, which is preferably a General Purpose Register to which information from memory is to be transferred. Field RA designates the base register, which is also preferably a General Purpose Register GPR and which designates a base address in the memory. The base address is similar to the base address discussed with respect to the embodiment of FIG. 1A. The displacement field of the Instruction Register 21 is discussed below.

Figure 3:
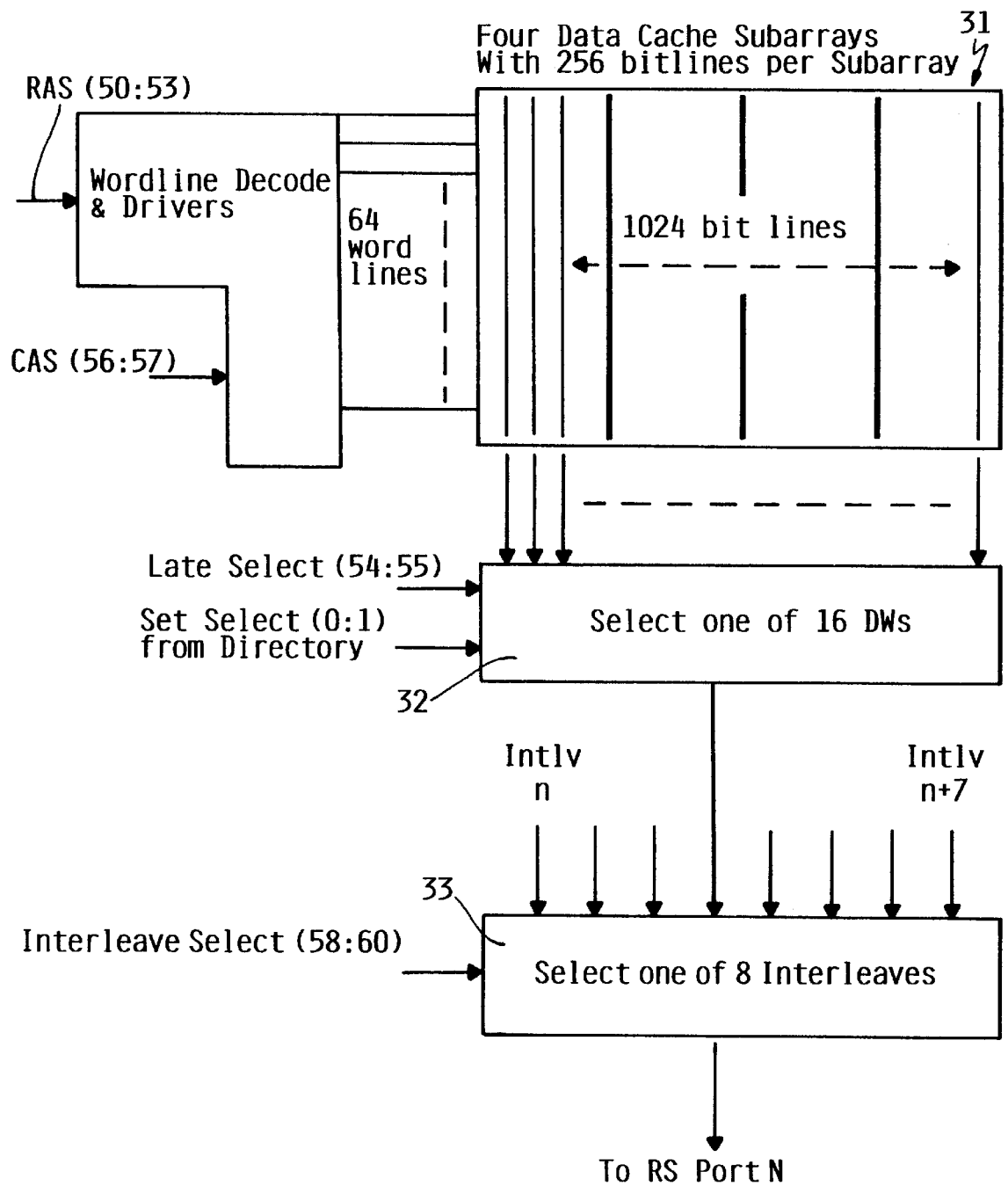
FIG. 3 is a schematic block diagram illustrating access to a data cache using the embodiment described with respect to FIG. 2.
Figure 4:
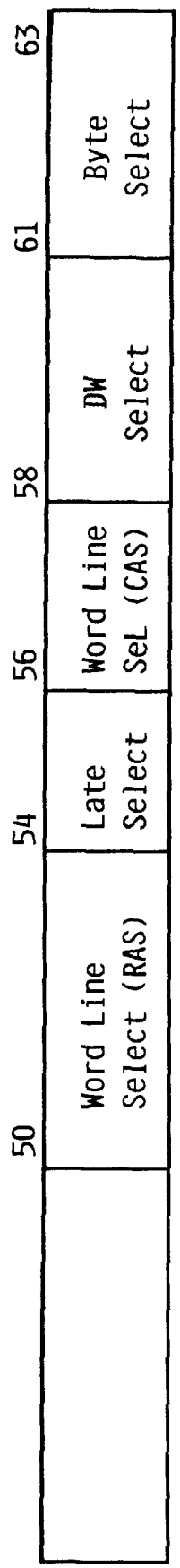
FIG. 4 shows a format of an effective address utilized in the embodiment of FIGS. 2 and 3.

Referring to FIG. 3, a data cache 31 may represent the L1 D-cache and is preferably configured to include eight interleaves of data cache arrays. Each data cache array is, in turn, physically configured as four subarrays, demarked in FIG. 3 by bold lines. Each subarray contains 256 bit lines and 64 common wordlines. The 256 bit lines in each subarray may be configured to correspond to four double words DW. Each double word typically includes 8 bytes ((8×8)×4 DW=256 bits). Each data cache array therefore may output 16 DWs.

The D-cache may be accessed by one or more RS ports. An RS (Read/Store) Port is a conventional port through which a D-cache receives an address. In operation, whenever an RS port presents a new address to the D-cache, information stored at that address is forwarded to the same RS port. This operation is conventional and need not be further discussed herein. Outputs from the D-cache which are directed to a given RS port may be buffered at the RS port, so that they may be forwarded to particular destinations, as appropriate. Although only one RS port is shown in FIG. 3, it is common to provide more than one.

In operation, the D-cache of FIG. 3 is accessed by presenting an effective address at one of the RS ports. An example of an Effective Address Register is shown in FIG. 4, including sub-fields labelled Word Line Select (Row Address Select; RAS) at bits 50–53; Late Select at bits 54–55; Word Line Select (Column Address Select; CAS) at bits 56–57; DW (Double Word) Select at bits 58–60; and Byte Select at bits 61–63. The purpose for these several sub-fields will be explained below.

Bits 0–49 in the Effective Address Register, like bits 0–49 in base register 22 of FIG. 2, are not used for accessing the D-cache although they are preferably used to access the cache directory, as is well known to those skilled in the art. The cache directory is the source for the Set Select bits (0–1) used by the first selector block 32 as will be described.

The effective address of FIG. 4 is obtained by the operation of the circuitry shown in FIG. 2. Address bits 50–53 (Row Address Select or RAS) in the Effective Address Register are used to start the first portion of the wordline decode in order to drive the requested array wordlines (see FIG. 3). Address bits 56–57 (Column Address Select or CAS) are used to complete the array wordline decode. The CAS bits are needed approximately two switch delays later than the RAS bits. The wordline decoder & driver shown in FIG. 3 is conventional and need not be further described herein.

Although the terms "row" and "column" are used in this discussion, it should be understood that these terms are merely illustrative. The memory need not be physically configured into rows and columns; the memory simply has subdivisions which are accessible by appropriate address select bits. The desired memory location will be found at an overlap of these subdivisions, e.g. at an overlap of the "row" and "column."

For a load or read operation, the D-cache memory array activates memory cells for any Read/Store (RS) Port that presents a new address to the array. There is no decoding and no chip select activation during the load operation. On the other hand, during a store operation, bits 58–60 in the effective address (DW Select; FIG. 4) are decoded and used in order to gate write data and write enable signals (not shown in FIG. 3) to the requested DW location in the array 31.

Because each of the eight cache arrays 31 is physically configured as four subarrays each having 256 bit lines, four double words DW are available from each subarray upon decoding of the RAS and CAS bits. Late Select bits 54–55 from the effective address (FIG. 4) are used to choose one of the four DWs available from each subarray. Set Select bits 0–1 (not shown in FIG. 4) determine the final DW to be forwarded from the data cache array corresponding to the respective interleave. The Set Select bits are determined from the access of the data cache directory. The estimated address bits 50–63 from the Effective Address Register are used to access the cache directory, while the remaining bits 0–49 of the Effective Address Register are used to compare against the tag found in the directory. This is conventional and need not be further detailed herein. Accessing the directory occurs in parallel with the access of the data cache array.

First selector block 32 in FIG. 3 includes conventional hardware logic circuits, as does second selector block 33.

After the correct DW is read from each of the eight data cache arrays, address bits 58–60 (DW Select) are used to finalize the selection of the requested interleave. Accordingly, a single DW of the eight available DWs is output from the D-cache and forwarded to the requesting RS port N. N can be any integer, and usually is between one and eight.

It will be understood that the memory structure for this implementation of the present invention may be configured in any manner appropriate for a prescribed computing environment. Depending on how the memory is organized, and the number of subdivisions used to access a particular memory location, one or more of the RAS, CAS, etc. address select bits may be omitted, or additional sets of address select bits may be added.

As indicated above, certain address select bits are needed before others. Therefore, the present invention is designed to provide the appropriate address select bits at appropriate time intervals. For example, with reference to FIG. 2, the RAS bits (50–53), used first to select the row address, are gated directly to the Effective Address Register (e.g. FIG. 4) from the base register 22 designated by the base register field RA in the Instruction Register 21. By gating them directly to the effective address register, these bits are available immediately.

The embodiment of FIG. 2 includes the Instruction Register 21, and base register 22 identified by the RA field of the Instruction Register 21. The Instruction Register preferably contains eleven bits (0–10) in a displacement field, which is analogous to the displacement field of Instruction Register 10 (FIG. 1A).

Circuitry for manipulating bits 0–10 of the displacement field and bits 50–63 of base register 22 includes logic gates (not shown) for gating the Row Address Select (RAS) bits 50–53 of the base register 22 directly to the Effective Address Register (e.g. FIG. 4). A 4-bit adder A 23 adds bits 7–10 from the Instruction Register 21 with bits 60–63 of the base register 22. A first 2-bit adder B 24 adds bits 5–6 from the Instruction Register 21 with bits 58–59 from the base register 22. A second 2-bit adder C 25 adds bits 3–4 from the Instruction Register 21 with bits 56–57 from the base register 22. A third 2-bit adder D 26 add bits 1–2 from the Instruction Register 21 with bits 54–55 from base register 22. In the embodiment of FIG. 2, bit 0 in the displacement register is not used for the addressing process.

A carry-out bit from first 2-bit adder B 24 is provided to second 2-bit adder C 25. A carry-out bit from second 2-bit adder C 25 is provided to third 2-bit adder D 26. A carry-out from 4-bit adder A 23 will be described below, and is preferably not forwarded to the first 2-bit adder B 24.

The 2-bit add performed by second 2-bit adder C 25 produces the CAS Select bits within approximately two switch delays after the RAS bits are available. The use of separate 2-bit adders C and D (25 and 26) is preferable over a single 4-bit adder because the CAS Select bits are needed sooner than the Late Select bits, and a 4-bit adder would take more time than the 2-bit adder C 25.

The 2-bit adder B 24 adds bits 58–59 from the base register RA to bits 5–6 from the displacement field of the Instruction Register in order to produce Double Word Interleave Select bits for the Effective Address Register (e.g. FIG. 4). Although these DW Select bits 58–59 are not needed as soon as the CAS Select bits when data is read from the D-cache, their timing becomes more critical during a store operation. Accordingly, it is also preferable that the 2-bit adder B 24 be a fast adder so as to provide the DW Select bits as early as possible during the instruction cycle. The three bits of the DW Select are obtained from the 2-bit adder B 24 and (one bit) from the 4-bit adder A 23.

The Byte Select bits output from 4-bit adder A (23) are used later in processing to select one or more particular bytes from the DW which was obtained from the D-cache. Therefore, the Byte Select bits need not be available as quickly as the other addressing bits. It may be possible to use a conventional, slower adder in order to implement adder A. However, this depends on the computing environment, the data organization, and the speed necessary to effect addressing between consecutive instruction cycles. Because 4-bit adder A 23 is preferably a slower adder than the first 2-bit adder B 24, its carry-out is preferably not supplied to adder B 24.

As indicated previously, an alternative slower address generating process is preferably used in parallel with the inventive process described herein. If the alternative process is used, then a comparison should be made to see whether the address generated by the alternative process is the same as the address generated by the present embodiment. This "comparison" may be performed efficiently by determining whether carry-outs are produced by one or more of the adders.

In the embodiment illustrated in FIG. 2, validating the estimated effective address which will be held in the Effective Address Register can be performed by observing whether a carryout was produced by the 4-bit adder A 23 or by the third 2-bit adder D 26. If either of these adders has produced a carry-out, then it is more than likely that the effective address loaded into the Effective Address Register (e.g. FIG. 4) was incorrectly estimated. For example, the carry-outs should have been included in the addition but were not, thus resulting in probable errors in the DW Select bits or the RAS bits in the Effective Address Register. Therefore, the data extracted from the D-cache using the incorrect effective address should be discarded.

Figure 6:
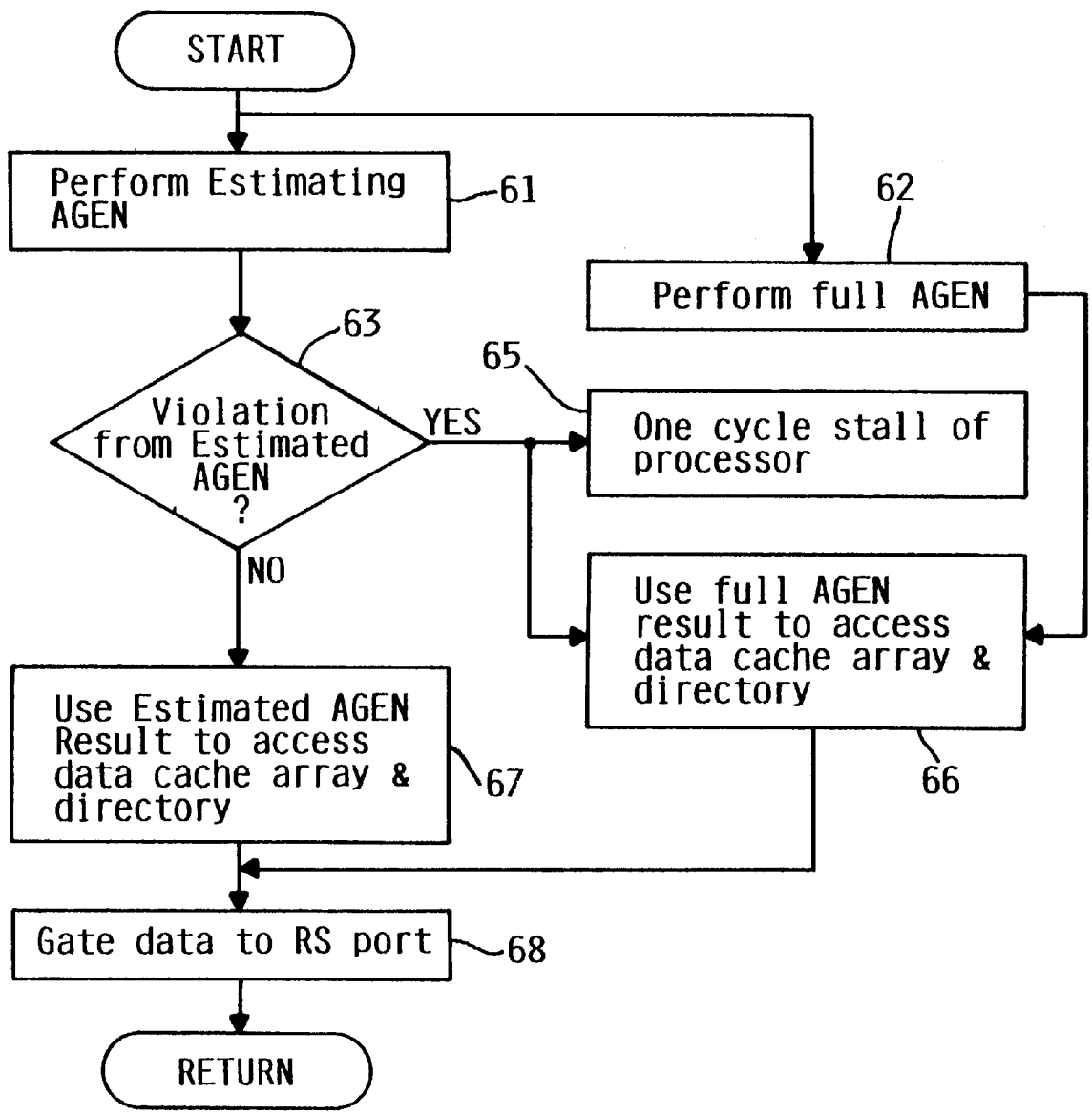
FIG. 6 is a flow diagram illustrating operation of the embodiment of FIG. 2.

FIG. 6 shows the sequence of steps performed in the embodiment of FIG. 2. Two address generation routines (AGENs) are performed in parallel. The first is the AGEN estimation of the present embodiment, in step 61. A full, slower AGEN routine is performed in step 62, and is not expected to be completed until after execution of steps 63 and 67. If the estimating AGEN routine shows a violation, for example by producing a carry-out is produced by adder 23 and/or adder 26, then the CPU is instructed to stall for one instruction cycle because it must wait for a D-cache access using the slower address from step 62 (steps 63 and 65).

If no violation is found in the estimating AGEN (step 63), then operation proceeds to step 67, in which information extracted from cache using the estimated AGEN is allowed to pass through the RS port which presented the address to the array (step 68). On the other hand, if a violation was found in step 63, then the information extracted from cache will not be gated, and the system waits (stalls) until information is extracted from cache using the address generated by the full, slower AGEN of step 62 (step 66).

The estimating AGEN process of this embodiment takes advantage of the fact that the compiler will force alignment on the base register. As indicated previously, if 16-byte alignment is applied to the memory, then the lower four bits in the base register are expected to be zero. See FIG. 2. Similarly, if the alignment is 32-byte, then the lower five bits are expected to be zero as shown in FIG. 1A. Other byte-size alignment is, of course, possible.

Referring again to FIG. 2, the illustrated circuit is appropriate for D-cache architecture which uses three different address subdivisions, each using different paths through the array access. If the compiler is certain that the bottom eleven bits of the base register RA are zeros, then it can prepare ahead of time to skip the bit-addition in the adders altogether. The compiler may permit instructions to use directly the eleven bits of displacement from the Instruction Register for a load instruction.

If, when performing a load instruction, the compiler is not certain that the eleven bits of the base register are zeros, then the compiler may perform pre-calculations in order to fill a base register with a faux base address so that the instruction displacement value does not cause a carry out from adder D. The compiler may perform these pre-calculations by, for example, squeezing in an extra instruction or taking advantage of spare parcels in VLIW architecture, and can perform them well before the load instruction is to be performed. In other words, the compiler may look ahead for possible problems and avoid likely adder carry-out situations, such as when it is aware of unusual alignments of the base register RA.

Because store instruction paths to the D-cache are longer, the compiler will allow the bottom eleven bits to be used in both the base register RA and the displacement field of the Instruction Register for all store instructions. For load instructions, only those bits of the displacement field which will not cause a carry-out of adder D are used, based on the assumptions of the data organization. If adder A 23 and/or D 26 produces a carry-out, then a stall cycle is required to complete the cache load operation.

Figure 5:
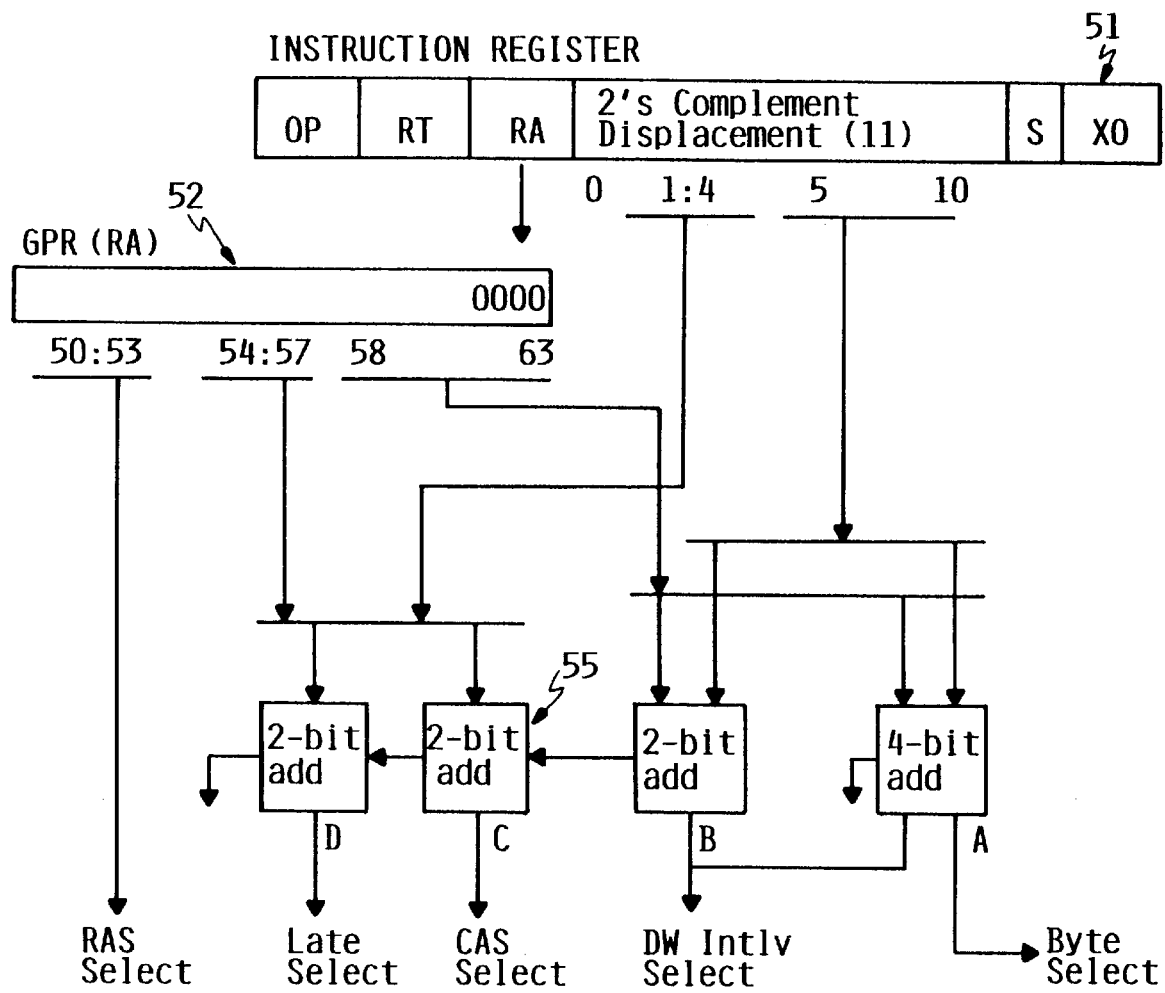
FIG. 5 is a schematic representation of circuitry according to yet another embodiment of the present invention.

The embodiment of FIG. 5 differs from that of FIG. 2 by allowing positive or negative displacement from the base address contained in base register 52. This embodiment may be implemented using two's complement in the displacement field of the Instruction Register 51, with the 0 bit of the Instruction Register indicating whether displacement is positive or negative. The 0 bit will likely be used in the full address generation path, but is not used in the fast address estimation path. In the 2's compliment embodiment of FIG.

5, a carry-out is expected from the third 2-bit adder D for validating the estimated address.

The critical path through the estimating AGEN process in the embodiments of FIGS. 2 and 5 is the second 2-bit adder C (25 or 55) which forms the wordline CAS bits. The CAS bits must traverse a distance to arrive at the L1 D-cache arrays. Rather than try to drive a long conductor from one driver, the conductor's path to the cache arrays is typically divided into shorter paths using buffer circuits to keep the signal from being slowed excessively by resistive/capacitive delays. The adders A, B, C, and D preferably double as these buffer circuits. That is, the logic circuitry of the adders is used not only to perform addition, but also to divide the wire path into shorter paths, thereby masking any extra delay in this critical path.

The second 2-bit adder C is formed by performing two separate 2-bit additions. Once using a forced carry-in bit and once with a forced "no carry-in bit" situation, thereby producing two sums. The correct sum is then selected from the two using the true carry-out from the 2-bit adder B.

Figure 7:
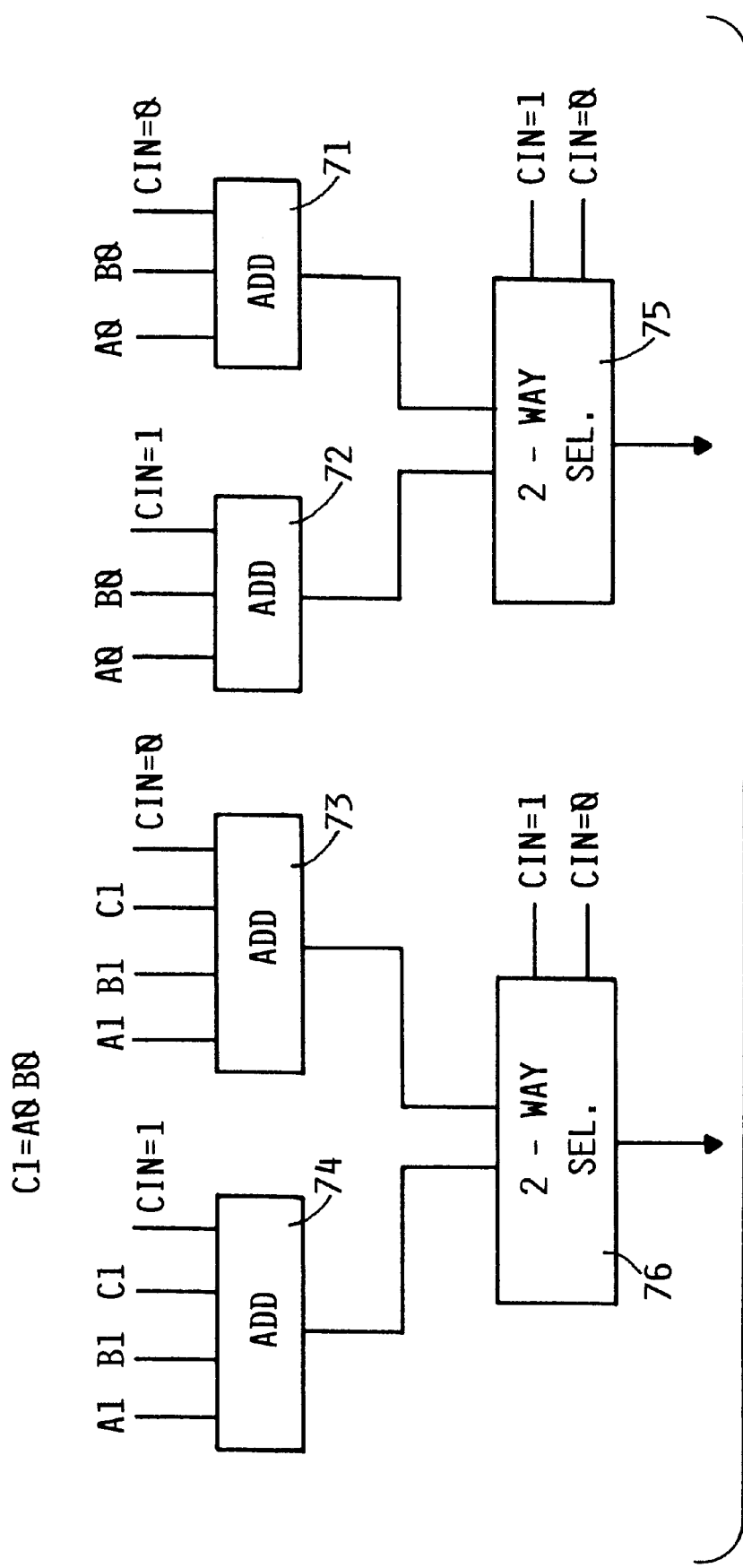
FIG. 7 is a schematic representation of a two bit fast adder illustrated in FIGS. 2 and 5.

One implementation of the fast 2-bit adder C is shown in FIG. 7, which shows the addition of 2-bit values (A0, A1; A0 being the lesser significant bit) and (B0, B1; B0 being the lesser significant bit). These values are generic representations of respective pairs of bits to be added. It is also noted that this implementation may also be adapted for 2-bit adders B and D.

The addition is preferably implemented using four adders 71, 72, 73, 74. Adder 71 adds bits A0 and B0, with no forced carry-in CIN=0. Adder 72 adds the same bits, but with a forced carry-in (CIN=1). Adder 73 adds bits A1 and B1, with no forced carry-in CIN=0. Adder 74 adds bits A1 and B1, but with a forced carry-in (CIN=1). The sum of the more significant bit position A1, B1 may be expressed as:

$$\{(A1\overline{B1}) \text{ OR } (\overline{A1}B1)\} \text{ XOR (carry-out)}$$

The carry-out is from the lower significant bits and can be expressed as:

$$(A0Cin \text{ OR } B0Cin \text{ OR } A0B0)$$

which simplifies to (A0 OR B0) when Cin=1, and to (A0B0) when Cin=0. Cin represents the carry-in from a lesser significant bit position. If the adder of FIG. 7 represents adder C of FIGS. 2 and 5, then Cin would come from adder B. An adder which implements these expressions and produces the sum in only two switch delays may include, for example, 2×2 AND-OR gates for the A1,B1 bit position and OR, NOR, AND, and NAND gates for the A0,B0 position, all leading to 3×4 AND-OR gates for selecting the correct sum according to the true carry-in. Referring to FIG. 7, the respective sum outputs from adders 71 and 72 are provided to a 2-way selector 75. The sum outputs from adders 73 and 74 are provided to a second 2-way selector 76.

The 2-way selectors 75 and 76 are respectively provided with the true carry-in. As stated above, if FIG. 7 were used to implement the 2-bit adder C, then the true carry-in would be provided from the 2-bit adder B. The 2-way selectors 75 and 76 provide the correct two-bit sum, which may correspond to CAS Select bits. Additional logic is included in the 2-bit adder C in order to determine whether a carry-out is to be provided to the 2-bit adder D. C1 represents the 1-bit carry-in from the sum of bits A0 and B0.

As will become apparent, the present invention is applicable for use in various environments in which an address must be generated. Another implementation of the present invention is possible in current complex programming environments.

Often, programming routines include one or more main routine which calls on one or more subroutines for smaller processing tasks. The routine will often tell the subroutine to perform its task, so that when the routine needs the results of that task, the results will be available. It is conventional for a subroutine to place its processing results into memory so that they can be retrieved by the routine when needed.

It is increasingly common, however, for a store instruction to be immediately followed by a request for the information being stored. That is, an instruction to store data into memory at the end of a subroutine is immediately followed by a next instruction from the main routine requesting that the data be read out for further processing. In this case, the data is not available for the next instruction because the physical process of storing data into memory takes longer than the time necessary to execute the "store instruction." The store instruction, in effect, sends the data toward the memory, but the data is often staggered through several buffer circuits before it finally ends up in the memory itself. Accordingly, the data is not actually stored in the memory until after the expiration of the "store instruction" cycle and therefore are not stored fast enough for the next instruction to have access to it from memory. The compiler must stall the next instruction for at least one full instruction cycle.

Figure 8A:
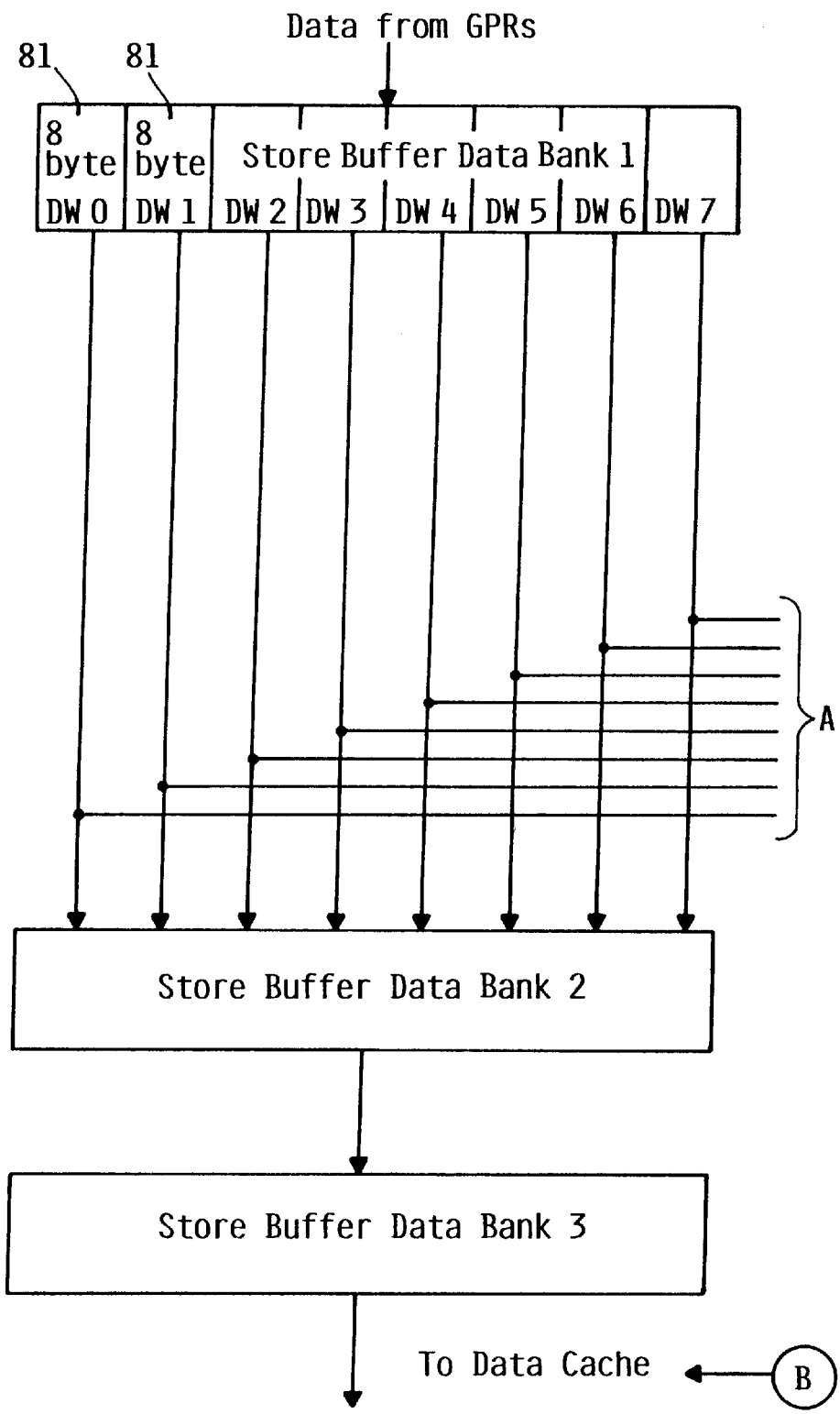
FIG. 8 illustrates an application of the present invention to retrieving information from a store buffer prior to its actual storage in a data cache.
Figure 8B:
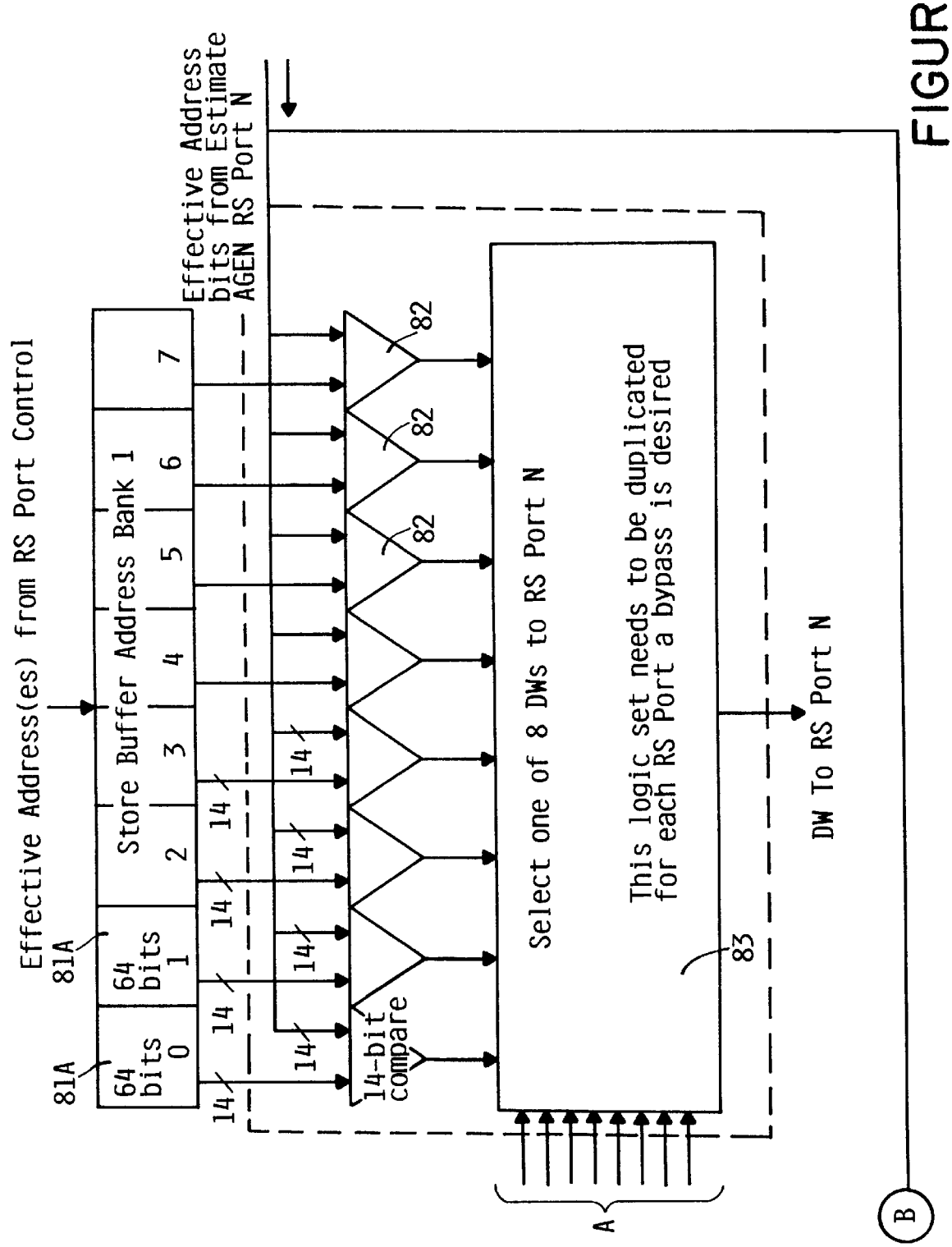

An implementation of the present invention is shown in FIG. 8 to permit data, which are on their way to being stored in memory, e.g. a data cache, to be immediately available for the next instruction cycle. With reference to FIG. 8, an exemplary embodiment shows data being stored from, for example, one or more general purpose registers GPRs. The data is first forwarded to a Store Buffer Data Bank 1, then to a Store Buffer Data Bank 2, then to a Store Buffer Data Bank 3, and finally to the memory. These Buffer Banks are conventional and their operation need not be further described. Their number may also vary. Although the preferred implementation taps the outputs from Buffer Data Bank 1, outputs from the other Buffer Data Banks may also (or in the alternative) be tapped. In FIG. 8, the memory (not shown) is described as a Data Cache, although the implementation will find applicability to other memory types.

FIG. 8 is illustrated particularly for VLIW architecture, although the implementation is not to be limited thereto. Each block 81 in Store Buffer Data Bank 1 may hold a double word DW. Other data element sizes are also possible, so reference to DWs should not to be considered limiting on the present invention.

A given subroutine's results may include one DW or several DWs. For each DW to be stored, a respective address is also provided. This address is supplied to a respective block 81A of the Store Buffer Address Bank 1. The generation of addresses to be found in blocks 81A of Store Buffer Address Bank 1 is conventional, and is not part of the present invention. Accordingly, no further discussion is necessary.

In practice, it takes time to transfer data from a respective GPR to its location in the Data Cache. The data will not be available from the Data Cache for at least one instruction cycle. Accordingly, the inventive address estimation is performed using the bits contained in the next immediate instruction, which will be found in an Instruction Register. The Instruction Register is not shown in FIG. 8 but is analogous to those shown in FIGS. 1, 2 and 5. The estimated address will be held in an Effective Address Register, analogous to that shown in FIG. 4.

The estimated address held in the Effective Address Register is compared with each of the addresses found in blocks the Store Buffer Address Bank 1, in order to determine whether any of the incoming data from the GPRs are on their way to the memory address which the current instruction wishes to access.

The address comparison preferably includes only the bits which were manipulated in the address estimation process. For example, only fourteen bits (50–63) were manipulated in FIGS. 2 and 4. A comparison of those bits will be performed in each of the comparators 82 of FIG. 8. If the comparison shows that the estimated address matches one of those held in the Store Buffer Address Bank 1, then the DW in a block 81 which corresponds to that address block 81A will be selected by selector 83 and passed on to the RS port "N" from which the instruction came. Thus, data which are in the process of being stored become, with the benefit of the present invention, available for use in the next immediate instruction cycle.

It is preferable also to perform a full comparison of the entire address from Store Buffer Address Bank 1 against the entire address generated by the estimation routine. This is because of the increased likelihood that the address from Store Buffer Address Bank 1 differs from the estimated address over all bits, not just the bits compared in comparators 82.

The estimated address held in the Effective Address Register (not shown) is also preferably forwarded to the memory (e.g. D-Cache in FIG. 8) as in the previously discussed embodiments.

Although the embodiment shown in FIG. 8 is particularly suitable for VLIW architecture, it is to be understood that other memory (and computing) architectures may be used.

Figure 9:
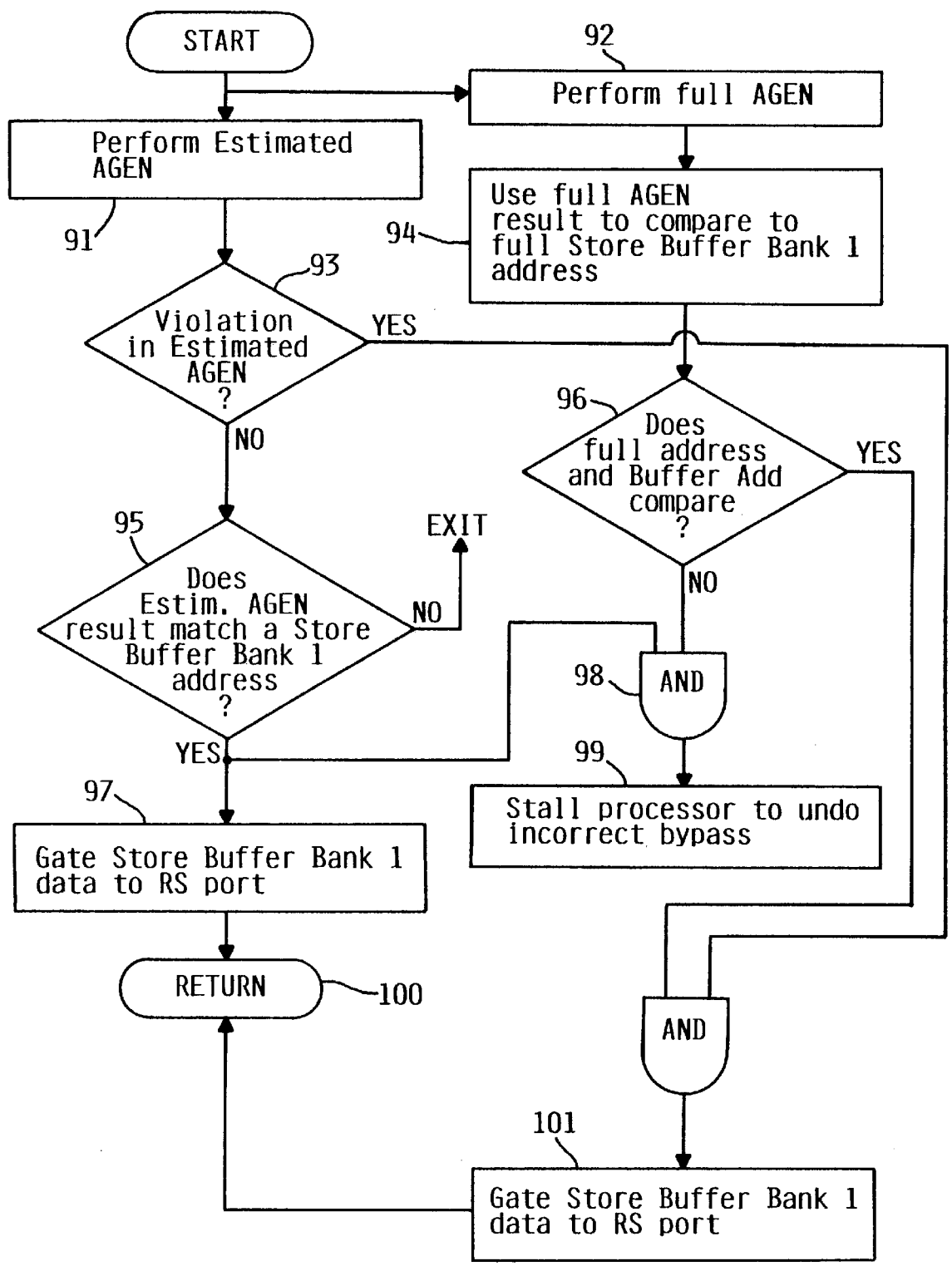
FIG. 9 is a flow diagram illustrating operation of the embodiment described with respect to FIG. 8.

The operation of the embodiment shown in FIG. 8 is further described with reference to FIG. 9. In FIG. 9, the estimated address generation AGEN step 91 is performed in parallel with the full address generation routine 92. Step 93 tests for a violation in the estimated AGEN of step 91. If there is no violation, for example no carry out was produced by the adders, then the estimated AGEN is compared against the addresses from the Store Buffer Address Bank 1, in step 95. If the estimated AGEN does not match any of the addresses from Store Buffer Address Bank 1, then the fast address routine of FIG. 9 is exited, leaving only the full address routine. That is, the full address routine may extract information from the Store Buffer Data Bank even though the fast address generation routine fails.

If there is a match in step 95 of the estimated AGEN in one of the comparators 82, then the fast address routine proceeds to step 97 in which the corresponding information from Store Buffer Data Bank 1 is gated to the requesting port. From step 97, the process returns at step 100.

At the same time that step 97 gates the information to the requesting RS port, the 'yes' branch of step 95 also is input to an AND decision block 98.

Meanwhile, the full address generation routine has been ongoing. In step 94, the full AGEN is compared against the full addresses contained in Store Buffer Address Bank 1. A determination is made in step 96 whether there is a positive comparison of the full addresses. If there is no positive comparison of the full address, and the fast address routine found a positive comparison, then AND decision block 98 provides an output to step 99. Step 99 stalls the processor because the information which is being gated at step 97 is incorrect.

In step 93, if a violation is found in the estimated AGEN, for example a carry-out is produced from an adder, AND if step 96 determines that the full AGEN result compares to an address held in the Buffer Address Bank, then the information from the Store Buffer Data Bank 1 is gated to the requesting RS port in step 101, albeit one cycle later than would have occurred in step 97. From step 101, the routine returns at step 100.

Although the above embodiments illustrate the Data Caches as being accessed by only one RS port, it is to be understood that several such ports may have access to the cache. For example, eight ports may access the cache, or duplicate caches may be accessed by four separate ports.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of retrieving information from a location in memory within a reduced number of instruction cycles, comprising the steps of:
   (a) providing an address register;
   (b) providing a load instruction having a base register with a base address and a displacement field;
   (c) generating a speculative address of the location in memory by gating a first plurality of bits from the displacement field into a first predetermined portion of the address register and gating a second plurality of bits from the base address into a second predetermined portion of the address register and mathematically combining a third plurality of bits from the displacement field with a fourth plurality of bits from the base address, and forwarding a result of the mathematical combination to a third predetermined portion of the address register;
   (d) accessing the location in memory based on said speculative address, said steps (b) and (d) of respectively providing and accessing being performed in consecutive instruction cycles with said step (c) being performed therebetween; and
   (e) storing the speculative address in the address register.

2. A method of retrieving information from a location in memory within a reduced number of instruction cycles, comprising the steps of:
   (a) providing a load instruction having a base register with a base address and a displacement field;
   (b) generating a speculative address of the location in memory by concatenating in part a first subfield of the base address and a second subfield of the displacement field, and by calculating both a first address identifying a first subdivision of the memory and a second address identifying a second subdivision of the memory;
   (c) accessing the first subdivision of the memory immediately upon calculating said first address;
   (d) accessing the second subdivision of the memory immediately upon calculating said second address;
   (e) accessing the location in memory based on said speculative address;
   said step of generating said speculative address being performed between consecutive instruction cycles of said step (a) and step (e).

3. An apparatus for retrieving information from a location in memory, comprising:
   a memory;
   a base register comprising a first plurality of bits identifying a base address in memory;
   a displacement register comprising a second plurality of bits identifying a displacement from the base address in memory;

an address register for holding a memory address;

a first gate for gating said first plurality of bits into a first portion of said address register;

a second gate for gating said second plurality of bits into a second portion of said address register;

mathematical logic for combining a third plurality of bits from said base register with a fourth plurality of bits from said displacement register, and forwarding a result of the mathematical combination to a third portion of said address register, said memory address comprising said first, second, and third portions of said address register and said memory address produced early in a first instruction cycle such that said information may be retrieved before expiration of said first instruction cycle.

4. A method for generating a memory address in an address register, comprising the steps of:

(a) receiving an instruction command into an instruction register, the instruction command including a base register identifier and a displacement identifier;

(b) accessing a base register identified by the base register identifier;

(c) gating a first set of bits from the base register into a first predetermined portion of an address register;

(d) gating a second set of bits from the displacement identifier into a second predetermined portion of the address register; and (e) adding a third set of bits from the base register to a fourth set of bits from the displacement identifier and providing a sum output, the sum output being providing to a third predetermined portion of the address register.

5. The method of claim 4, wherein said step (e) includes a plurality of independent adding operations, each adding operation adding respective pluralities of bits from the third and fourth sets of bits.

6. The method of claim 4, wherein said instruction command is a load/store instruction command.

7. The method of claim 4, wherein the base register identifier identifies a general purpose register.

8. The method of claim 4, further comprising the steps of:

(f) providing a memory operatively associated with the address register; and (g) accessing a desired memory location identified by at least the first, second, and third portions included in the address register.

9. The method of claim 8, further comprising the step of:

(h) determining whether the adding operation of said step (e) includes a carry out, and only if no carry out is included, then proceeding with the accessing of said step (g).

10. The method of claim 9, further comprising the step of:

(i) generating the memory address using an alternative address generation method more time consuming than a time required to execute said steps (c), (d), (e), and (g), the alternative address generation method being performed in parallel with said steps (c), (d), (e), and (g); and (j) awaiting, only when said step (h) determines that the carry out is included, the memory address generated by the alternative address generation method of said step (i) in order to access the memory address.

11. The method of claim 8, wherein said step (g) includes the sub-steps of:

(g-1) accessing a first subdivision of the memory using at least one bit from the gated first set of bits; and (g-2) accessing a second subdivision of the memory using at least one bit from the sum output provided to the third portion of the address register, the memory location being within the first and second subdivisions.

12. The method of claim 11, wherein said sub-step (g-1) is performed prior to the availability of the sum output.

13. The method of claim 11, wherein said step (g) further includes the sub-step of:

(g-3) accessing, after said sub-steps (g-1) and (g-2), a third subdivision of the memory using at least one bit from the sum output other than the at least one bit used in said sub-step (f-2), the memory location being within the third subdivision.

14. An apparatus for generating a memory address into an address register, comprising:

an address register;

an instruction register containing an instruction command, the instruction command including a base register identifier and a displacement identifier;

a base register identified by the base register identifier;

first logic gate means for gating a first set of bits from the base register into a first predetermined portion of said address register;

second logic gate means for gating a second set of bits from the displacement identifier into a second predetermined portion of said address register; and adding means for adding a third set of bits from the base register to a fourth set of bits from the displacement identifier and providing a sum output to a third predetermined portion of said address register.

15. The apparatus of claim 14, wherein said adding means includes a plurality of bit adders, each bit adder adding respective bits from the third and fourth sets of bits.

16. The apparatus of claim 14, wherein said instruction command is a load instruction command.

17. The apparatus of claim 14, wherein the base register is a general purpose register.

18. The apparatus of claim 14, wherein the first, second, and third predetermined portions of the address register together form a desired address, the apparatus further comprising:

a memory operatively associated with said address register, the desired address representing at least a part of an address in said memory;

a first buffer for storing first information to be stored into said memory;

a second buffer for storing a first address, the first address identifying a memory location in said memory where the first information is to be stored;

a comparing device for comparing at least a portion of the first address with at least a portion of the desired address, the comparing device producing a comparison result when the compared portions are identical;

an output port; and a selector for selectively forwarding the first information to the output port when the comparison result is produced by said comparing device.

19. The apparatus of claim 14, wherein the memory location identified by the contents of said address register is located within an overlap of first and second subdivisions of the memory, at least one bit from the gated first set of bits identifying the first subdivision, and at least one bit from the sum output provided to the third portion of the address register identifying the second subdivision.

20. The apparatus of claim 19, wherein the memory location is located within a portion of a third subdivision of the memory overlapping the first and second subdivisions, the third subdivision being identified by at least one bit from the sum output other than the at least one bit identifying the second subdivision.

21. The apparatus of claim 14, further comprising:

a memory operatively associated with the address register;

memory access means for accessing the memory location based upon the generated memory address, and for providing a data output including the contents of the accessed memory location; and determining means for determining whether said adding means produces a carry out, and for allowing, only if no carry out is produced, the data output to be forwarded for use.

22. The apparatus of claim 21, further comprising:

an alternative memory address generator for generating the second memory address in a time longer than the time required to generate the memory address by said adding means and said first and second logic gate means, wherein said alternative address generator operates in parallel with said adding means and said first and second logic gate means, and further wherein said determining means causes said memory access means to access a memory location identified by said second memory address only when a carry out is produced by said adding means, such that contents at the second memory address are provided as the data output.

23. The apparatus of claim 14, wherein at least one of said bit adders is more time consuming than another of said bit adders such that respective first and second sums provided by said one and another bit adders are available at different times.

24. The apparatus of claim 23, wherein said first and second sums are used to access respective subdivisions of memory as they become available in sequence, the memory address being located within an overlap of the respective subdivisions.

25. A method for retrieving a desired one of a plurality of information elements as it is being stored into a main memory, each information element being provided to the main memory from a buffer blank and having an associated target address specifying a location in main memory, comprising the steps of:

(a) holding, in the buffer bank, at least one first information element to be stored into the main memory;

(b) providing target address data associated with each first information element held in step (a);

(c) providing a load command requesting a retrieval of contents of a desired memory address in the main memory;

(d) comparing at least a portion of the desired memory address with a corresponding portion of the target address, and producing a comparison result when the compared portions are identical;

(e) forwarding the first information element from the buffer bank to an output port if the comparison result of step (c) is produced.

26. The method of claim 25, wherein the buffer bank includes a plurality of buffers for storing a plurality of the first information elements, including the one first information element, and target address data is provided for each independent group of the first information elements, and further wherein said step (d) is performed for each of the target address data provided.

27. The method of claim 25, further comprising the steps of:

(f) providing a base register having a plurality of bits identifying a base address in the main memory;

(g) providing an instruction register having a displacement field, the displacement field indicating a displacement from the base address to the desired memory address;

(h) gating a first plurality of bits from the base register to a first predetermined part of an address register, the address register operatively associated with the main memory;

(i) gating a second plurality of bits from the displacement field to a second predetermined part of the address register;

(j) mathematically combining a third plurality of bits from the base register with a fourth plurality of bits from the displacement field and producing a mathematical result to a third predetermined part of the address register, wherein the first, second, and third predetermined parts of the address register together form at least a portion of the desired address.

28. The method of claim 25, wherein said step (a) is caused by a command commanding storage of the first information element into the main memory, the command being carried out by passage of the first information element through the buffer bank to the main memory.

29. The method of claim 25, wherein the output port does not lead to the main memory, resulting in retrieval of the contents of the desired memory address before the contents are stored in the desired memory address.

30. An apparatus for retrieving information being stored into a main memory, comprising:

a main memory;

a first buffer for storing a first information element to be stored into said main memory;

a second buffer for storing first target address data, the first target address data identifying a memory location in said main memory where the first information element is to be stored;

a comparing device for comparing at least a portion of the first target address with at least a portion of a desired address, the desired address identifying a memory location in said main memory from which information is to be retrieved, the comparing device producing a comparison result when the compared portions are identical;

an output port; and a selector for selectively forwarding the first information element to the output port when the comparison result is produced by said comparing device.

31. The apparatus of claim 30, further comprising:

an address register operatively associated with said main memory;

an instruction register containing an instruction command, the instruction command including a displacement identifier;

a base register storing a base address;

first logic gate means for gating a first set of bits from the base address into a first predetermined portion of said address register;

second logic gate means for gating a second set of bits from the displacement identifier into a second predetermined portion of said address register; and adding means for adding a third set of bits from the base address to a fourth set of bits from the displacement identifier and providing a sum output to a third predetermined portion of said address register, the first, second, and third predetermined portions of the address register corresponding to the desired address.

32. The apparatus of claim 30, wherein the output port does not lead to the main memory, resulting in retrieval of the information from the desired address before the information is stored in the memory location.

33. The apparatus of claim 30, wherein the output port leads from the first buffer, such that the selector forwards the first information element for output from the output port before the first information element reaches the main memory.

34. A method of retrieving information from a location in memory within a reduced number of instruction cycles, comprising the steps of:
(a) providing a load instruction having a displacement field specifying in part the address of the location in memory;
(b) providing a base register, the base register storing a base address;
(c) providing an address register which is to contain the address of the location in memory;
(d) calculating the address of the location in memory by
    (d-1) gating a first plurality of bits from the displacement field into a first predetermined portion of the address register,
    (d-2) gating a second plurality of bits from the base address into a second predetermined portion of the address register; and
    (d-3) mathematically combining a third plurality of bits from the displacement field with a fourth plurality of bits from the base address, and forwarding a result of the mathematical combination to a third predetermined portion of the address register;
(e) accessing the location in memory based on said address calculated in said step (d), said steps (a) and (e) of respectively providing and accessing being performed in consecutive instruction cycles with said step (d) being performed therebetween.

35. A method of retrieving information from a location in memory within a reduced number of instruction cycles, comprising the steps of:
(a) providing a load instruction having a displacement field specifying in part the address of the location in memory;
(b) calculating the address of the location in memory from at least said displacement field by
    (b-1) calculating a first address identifying a first subdivision of the memory; and
    (b-2) calculating a second address identifying a second subdivision of the memory;
(c) accessing the location In memory based on said address calculated in said step (b) by
    (c-1) accessing the first subdivision immediately upon completion of said sub-step (b-1); and
    (c-2) accessing the second subdivision upon completion of said sub-step (b-2) such that the first and second addresses are provided as they are needed to access the first and second subdivisions,
wherein said steps (a) and (c) of respectively providing and accessing being performed in consecutive instruction cycles with said step (b) being performed therebetween.

36. An apparatus for retrieving information from a desired location in memory within a reduced number of instruction cycles, comprising:
a memory;
a base register including a first set of bits identifying a base address in the memory;
a displacement register including a second set of bits identifying a displacement from the base address whence desired information is to be retrieved; and
hardware logic comprising:
    an address register for holding the desired memory address;
    first gating means for gating a first plurality of bits from the first set into a first predetermined portion of said address register;
    second gating means for gating a second plurality of bits from the second set into a second predetermined portion of said address register;
    mathematical logic for combining a third plurality of bits from the first set with a fourth plurality of bits from the second set, and forwarding a result of the mathematical combination to a third predetermined portion of said address register;
said hardware logic producing a desired memory address indicating a location in said memory where the desired information is to be found, said hardware logic producing the desired memory address early in a first instruction cycle such that the desired information may be retrieved before expiration of the first instruction cycle.

37. An apparatus for retrieving information from a desired location in memory within a reduced number of instruction cycles, comprising:
a memory;
a base register including a first set of bits identifying a base address in the memory, said base register being a general purpose register;
an instruction register indicating a load or store instruction, said instruction register comprising a displacement field containing a second set of bits identifying a displacement from the base address whence desired information is to be retrieved, said instruction register further comprising a base register field identifying said base register;
hardware logic for producing a desired memory address indicating a location in said memory where the desired information is to be found, said hardware logic producing the desired memory address early in a first instruction cycle such that the desired information may be retrieved before expiration of a next immediate instruction cycle.

* * * * *